(12) United States Patent
Iorio et al.

(10) Patent No.: US 8,886,673 B2
(45) Date of Patent: Nov. 11, 2014

(54) OPTIMIZING DATA CACHE WHEN APPLYING USER-BASED SECURITY

(71) Applicant: International Business Machines Corporation, Armonk, NY (US)

(72) Inventors: Pierre Iorio, Gatineau (CA); Gregoire D. Lanthier, Ottawa (CA); John C. Griggs, Ottawa (CA); Robin N. Grosset, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/747,083

(22) Filed: Jan. 22, 2013

(65) Prior Publication Data

US 2013/0132677 A1   May 23, 2013

Related U.S. Application Data

(63) Continuation of application No. 12/714,225, filed on Feb. 26, 2010, now Pat. No. 8,375,056.

(51) Int. Cl.
| | |
|---|---|
| *G06F 17/30* | (2006.01) |
| *G06F 12/08* | (2006.01) |
| *G06F 12/14* | (2006.01) |
| *H04L 29/08* | (2006.01) |

(52) U.S. Cl.
CPC ........ *G06F 12/0864* (2013.01); *G06F 17/3048* (2013.01); *H04L 67/306* (2013.01); *H04L 67/2847* (2013.01); *G06F 12/1458* (2013.01); *H04L 67/2852* (2013.01)
USPC ....................................... 707/783

(58) Field of Classification Search
CPC   G06F 17/3048; G06F 21/604; G06F 21/6209

USPC .......................................... 707/782, 783, 784
See application file for complete search history.

(56) References Cited

U.S. PATENT DOCUMENTS

| 6,279,033 B1 | 8/2001 | Selvarajan et al. |
|---|---|---|
| 7,007,020 B1 | 2/2006 | Chen et al. |

(Continued)

FOREIGN PATENT DOCUMENTS

| CN | 1484155 A | 3/2004 |
|---|---|---|
| CN | 1505788 A | 6/2004 |

(Continued)

OTHER PUBLICATIONS

T. Eavis, et al., "MapGraph: Efficient Methods for Complex OLAP Hierarchies," 2007, pp. 465-474.

(Continued)

*Primary Examiner* — Rehana Perveen
*Assistant Examiner* — Scott A Waldron
(74) *Attorney, Agent, or Firm* — Sughrue Mion, PLLC

(57) ABSTRACT

A secure caching system and caching method include receiving a user request for data, the request containing a security context, and searching a cache for the requested data based on the user request and the received security context. If the requested data is found in cache, returning the cached data in response to the user request. If the requested data is not found in cache, obtaining the requested data from a data source, storing the obtained data in the cache and associating the obtained data with the security context, and returning the requested data in response to the user request. The search for the requested data can include searching for a security list that has the security context as a key, the security list including an address in the cache of the requested data.

29 Claims, 13 Drawing Sheets

(56) References Cited

U.S. PATENT DOCUMENTS

| | | |
|---|---|---|
| 7,051,038 B1 | 5/2006 | Yeh et al. |
| 7,133,865 B1 | 11/2006 | Pedersen et al. |
| 7,222,130 B1 | 5/2007 | Cras et al. |
| 7,249,118 B2 | 7/2007 | Sandler et al. |
| 2003/0236781 A1 | 12/2003 | Lei et al. |
| 2004/0068579 A1 | 4/2004 | Marmigere et al. |
| 2004/0243839 A1 | 12/2004 | Bhatia et al. |
| 2005/0262087 A1 | 11/2005 | Wu et al. |
| 2007/0027829 A1 | 2/2007 | Graf |
| 2007/0027876 A1 | 2/2007 | Graf |
| 2007/0156694 A1 | 7/2007 | Lim |
| 2007/0233957 A1 | 10/2007 | Lev-Ran et al. |
| 2008/0077557 A1 | 3/2008 | Schneider et al. |
| 2008/0114793 A1 | 5/2008 | Grosset et al. |
| 2008/0250000 A1 | 10/2008 | Wories et al. |
| 2009/0024794 A1 | 1/2009 | Iyer et al. |
| 2009/0198892 A1 | 8/2009 | Alvarez et al. |

FOREIGN PATENT DOCUMENTS

| | | |
|---|---|---|
| CN | 1221898 C | 10/2005 |
| CN | 1774901 A | 5/2006 |
| CN | 101052944 A | 10/2007 |
| JP | 2004-264956 A | 9/2004 |
| JP | 2005-071085 A | 3/2005 |
| JP | 2005-196382 A | 7/2005 |
| JP | 2005-267647 A | 9/2005 |
| JP | 2006-196008 A | 7/2006 |
| JP | 2007-501984 A | 2/2007 |
| JP | 2007-219619 A | 8/2007 |
| JP | 2010-027058 A | 2/2010 |

OTHER PUBLICATIONS

J. Albrecht, et al., "Query Optimization by Using Derivability in a Data Warehouse Environment," DOLAP, 2000, pp. 49-56.

D. Riazati, et al., "Drill Across & Visulization of Cubes with Non-Conformed Dimensions," Proc. 19th Australasian Database Conference, ADC, 2008, pp. 97-106.

International Search Report and written opinion issued in corresponding European Application No. PCT/EP2011/052612, dated Feb. 28, 2012.

Bauer A et al: "Data-Warehouse-Systeme, passage", Jan. 1, 2001, Architektur Entwicklung Anwendung, Dpunkt.Verlag GMBH, Heidelberg Germany, XP002669604, ISBN: 978-3-932588-76-1, pp. 128-147.

Bauer A et al: "Data-Warehouse-Systeme, passage", Jan. 1, 2001, Architektur Entwicklung Anwendung, Dpunkt.Verlag GMBH, Heidelberg Germany, XP002669632, ISBN: 978-3-932588-76-1, pp. 238-247.

Bauer A et al: "Data-Warehouse-Systeme, passage", Jan. 1, 2001, Architektur Entwicklung Anwendung, Dpunkt.Verlag GMBH, Heidelberg Germany, XP002669633, ISBN: 978-3-932588-76-1, pp. 301-303.

Mathias Kohler et al: "ProActive Access Control for Business Process-Driven Environments", Computer Security Applications Conference, 2008 Piscataway, NJ, USA, Dec. 8, 2008, pp. 153-162, XPO31376771, ISBN: 978-0-7695-3447-3.

Y. Li, et al., "Representing UML Snowflake Diagram from Integrating XML Data Using XML Schema," Proceedings of the 2005 Int'l Workshop of Data Engineering Issues in E-Commerce, IEEE, 2005, 9 pages total.

Office Action dated Aug. 5, 2014 issued by the State Intellectual Property Office of the People's Republic of China in counterpart Chinese Patent Application No. 201180010922.5.

OPTIMIZING DATA CACHE WHEN APPLYING USER-BASED SECURITY

CROSS-REFERENCE TO RELATED APPLICATION

This application is a Continuation of U.S. patent application Ser. No. 12/714,225, which was filed on Feb. 26, 2010 and has issued as a U.S. Pat. No. 8,375,056, the disclosure of which is incorporated herein by reference in its entirety.

BACKGROUND

1. Field of the Invention

The present disclosure relates to the field of databases, and specifically, to optimizing retrieval of data.

2. Description of the Related Art

Business Intelligence (BI) is a category of software that facilitates business enterprise decision-making and governance. BI provides reporting/analysis tools to analyze, forecast and present information; it also provides database management systems to organize, store, retrieve, and manage data in databases, such as Online Analytic Processing ("OLAP") databases.

OLAP data sources and tools are a subset of BI tools. OLAP tools are report generation tools and are a category of database software. OLAP provides an interface for the user to limit raw data according to user predefined functions and interactively examine results in various dimensions of data. OLAP systems provide a multidimensional conceptual view of data, including full support for hierarchies and multiple hierarchies. OLAP tools are typically implemented in a multi-user client/server mode to offer consistently rapid responses to queries, regardless of database size and complexity. OLAP allows the user to synthesize information using an OLAP server that is specifically designed to support and operate on multidimensional data sources. The design of the OLAP server and the structure of the data are optimized for rapid ad hoc information retrieval in any orientation.

In terms of structure and volume, typical OLAP systems are organized as follows, with the upper structural elements acting as containers for the lower elements:

Cubes—tens per application
Dimensions—tens per cube, hundreds per application
Hierarchies—ones per dimension, hundreds per application
Levels—ones per hierarchy, hundreds to thousands per application
Members—hundreds to thousands per level, tens of thousands to millions per application In a BI Reporting System, the query performance of each user gesture must be as fast as possible. A cache memory, or cache, is commonly used to speed up the process. Specifically, a data cache may be used to store commonly used items of data (including metadata) so that the fetching of data from the data source is minimized. FIG. 1 shows a conventional BI system that more typically includes a data cache. This figure is described in further detail below.

The data cache may store various different types of data including metadata, which is understood to be "data about data." For example, any instance of the above-mentioned OLAP structural elements, such as a "Geography" dimension or a "Canada" member, may be stored in a data cache. In fact, given that an OLAP data source may be a relational database organized as a star schema with dimension tables on the perimeter and for which every dimension member is stored as a row in a dimension table, members are often considered to be data rather than metadata. Accordingly, it is not necessary to distinguish a different type of cache for different types of data.

Different users of the BI Reporting System may have different security rights such that access to particular data (including metadata) may be restricted. These security rights are defined within the security subsystem of each OLAP data source that the BI Reporting System interfaces with. An OLAP data source's security subsystem is typically organized as a set of security profiles. Users are assigned to specific security groups, which could be nested and remain fixed even after users authenticate (log in) to the BI Reporting System. Users may also be assigned permitted security roles, and have the opportunity to select one or more of these roles when authenticating (logging into) the BI Reporting System. Each security profile associates one named security group or role with a specific set of access rights. OLAP systems may restrict access to data for various different security profiles, with different rules specified against different types of data.

When a user authenticates (logs into) the BI Reporting System and queries data from a specific OLAP cube, the combination of effective security profiles for that authenticated user and OLAP data source, is what defines this user's security context. For example, a user authoring a Time by Geography sales report (cross-tab) may not be entitled to see the results of all potentially available years and every geographic location (for example, countries); certain year and country members are therefore filtered out based on this user's security context (effective security profiles defining access to the Time and Geography dimensions).

A. State of the Art

When caching data, the BI system needs to know what data is common among users and therefore can be safely shared (seen by different users), and what data is not common, i.e. secure (not to be seen by certain types of users). To address this requirement, most BI systems currently implement one of two typical approaches. The first approach is to have system administrators copy and redefine the security rules (access rights) of the underlying OLAP data source, directly within the BI system, and have the BI system log into the data source as a single super user. This implies that filtering based on security context of each user needs to be performed prior and/or subsequent to any access to the cache in order to only return data that each user is entitled to view. A second approach is to have individual BI system users connect to the underlying OLAP data source using their own credentials, and to not share any cached data information between users. In general, the first approach is preferred for performance (uses less cache memory for the typically large volume of members), whereas the second approach is preferred for ease of maintenance.

B. Deficiencies in State of the Art

With the first approach where security rules are redefined in the BI system, every security profile needs to be maintained in two places: the BI system and the OLAP data source. In addition to being cumbersome, such security maintenance overhead is error-prone. On the other hand, with the second approach where multiple data caches are being created by the BI system (one cache per user), this makes for very inefficient usage of memory and, given the typically large volume of members, can prove to be quite costly in terms of performance.

BRIEF SUMMARY

According to one exemplary embodiment, a secure caching method is provided. This caching method includes receiving a user request for data and a security context, searching a cache for the requested data based on the user request and the received security context. If the requested data is found in the cache, returning the cached data in response to the user request. If the requested data is not found in the cache, obtaining the requested data from a data source, storing the obtained data in the cache and associating the obtained data with the security context, and returning the requested data in response to the user request.

This solution addresses deficiencies in the current state of the art, in the following matter. Because security rules are essentially "discovered" and "represented as security lists" (which can be placed in a data cache), as individual BI system users submit queries (reports), this data-source agnostic approach does not have the requirement that every security rule must be redefined in the BI system.

Furthermore, because security lists are lightweight lists of references to cached data, the cached data itself is independent of security profile and consequently contains little to no redundancy associated with the requirement to honor the access rights of different security profiles. With this solution, the cache memory is optimized in size and would not grow significantly as more and more users, having to the same or different security contexts, log into the BI system and submit reports/queries.

According to yet another exemplary embodiment, a secure caching method is provided in a system connected to a user and a data source, said data source having defined access rights based on a security context of users. The method includes receiving a user request including a security context and a data identifier and checking in a list storage for the presence of a list identified by the security context and the data identifier. If the list is not present, creating a list in the list storage identified by the security context and the data identifier, retrieving data from the data source, and storing the retrieved data in a data storage, and populating the created list with addresses of storage of the retrieved data stored in the data storage. If the list is present, retrieving data from the data storage using the storage addresses in said list.

According to another exemplary embodiment, a caching system is provided. The caching system includes a processor executing software modules and a memory storing the software module. The software modules include a receiver module which receives a user request for data and a security context, a search module which searches a cache for the requested data based on the user request and the received security context, and a management module which obtains the cached data in response to the user request if the requested data is found in the cache. If the requested data is not found in the cache, the management module obtains the requested data from a data source, stores the obtained data in the cache and associates the obtained data with the security context, and returns the requested data in response to the user request.

According to another exemplary embodiment, a computer readable medium storing instructions for secure caching is provided. The instructions include receiving a user request for data and a security context and searching a cache for the requested data based on the user request and the received security context. If the requested data is found in the cache, returning the cached data in response to the user request. If the requested data is not found in the cache, obtaining the requested data from a data source, storing the obtained data in the cache and associating the obtained data with the security context.

BRIEF DESCRIPTION OF THE DRAWINGS

Certain aspects of the present invention will become more apparent by describing in detail illustrative, non-limiting embodiments thereof with reference to the accompanying drawings, in which like reference numerals refer to like elements in the drawings.

DETAILED DESCRIPTION

Figure 1:
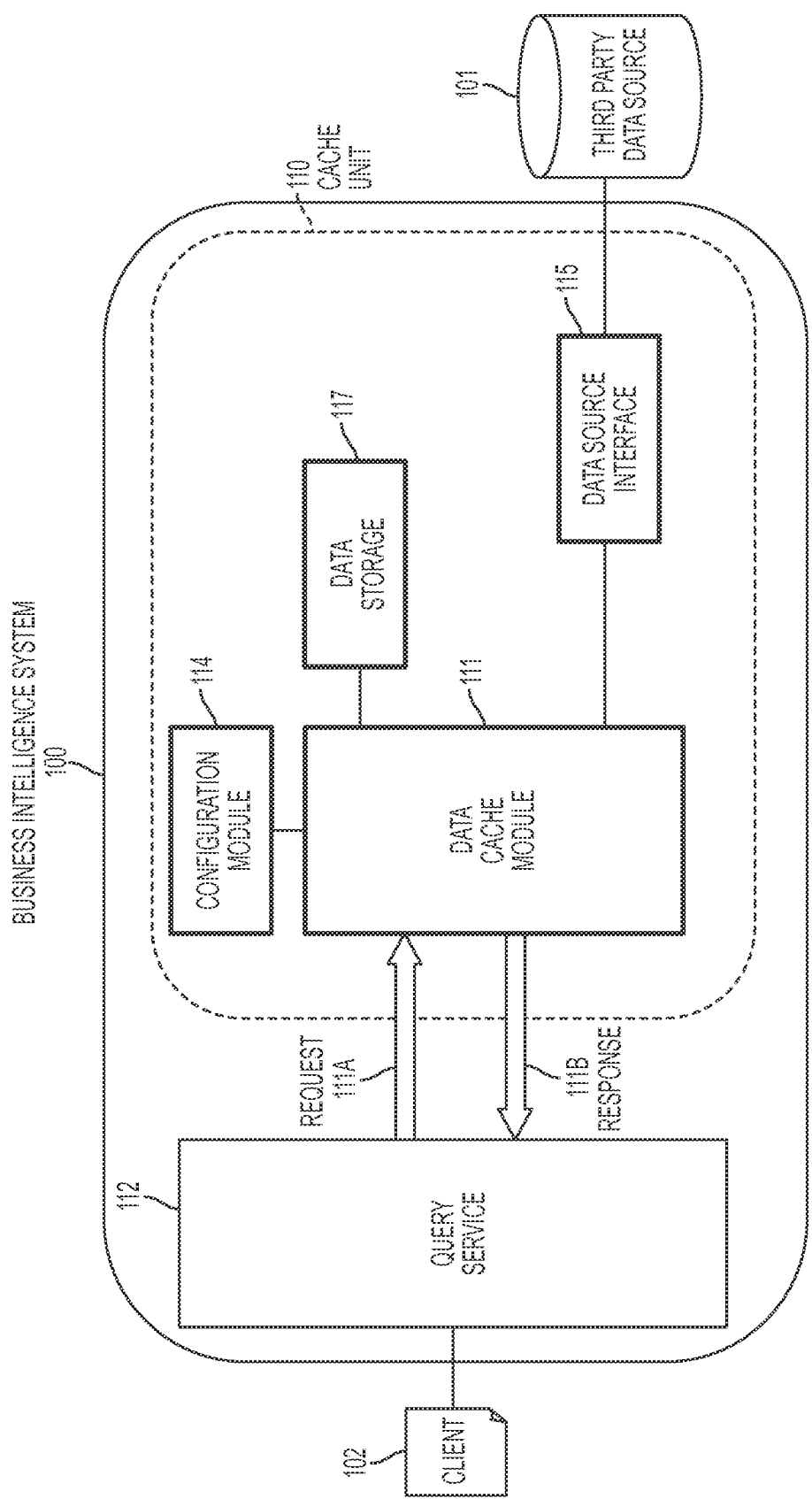
FIG. 1 is a block diagram illustrating a BI system according to a related art technique.

To help contrast certain embodiments of the invention with conventional data cache systems, a conventional data cache system is now discussed with reference to FIG. 1. As noted above, FIG. 1 is a block diagram illustrating a BI system with a conventional data cache according to a related art technique. In FIG. 1, a client 102 requests data using a query service 112. The query generated with the query service 112 is provided as a request 111A to a cache unit 110. The cache unit 110 includes a data cache module 111 which interfaces with the query service and the modules of the cache unit 110, a configuration module 114 which affects caching behavior, a data storage 117 which stores data, and a data source interface 115 which retrieves information from one or more third party data sources 101. The data cache module 111 provides retrieved data obtained from storage 117, or if unavailable in the storage 117, from the third party data source 101, in a response 111B to the query service 112, which in turn provides it to the client 102. In this conventional system, if the third party data source 101 employs security rules that affect data visibility/accessibility for different users, one of the two typical approaches, described above in the background section, is usually applied.

Figure 2:
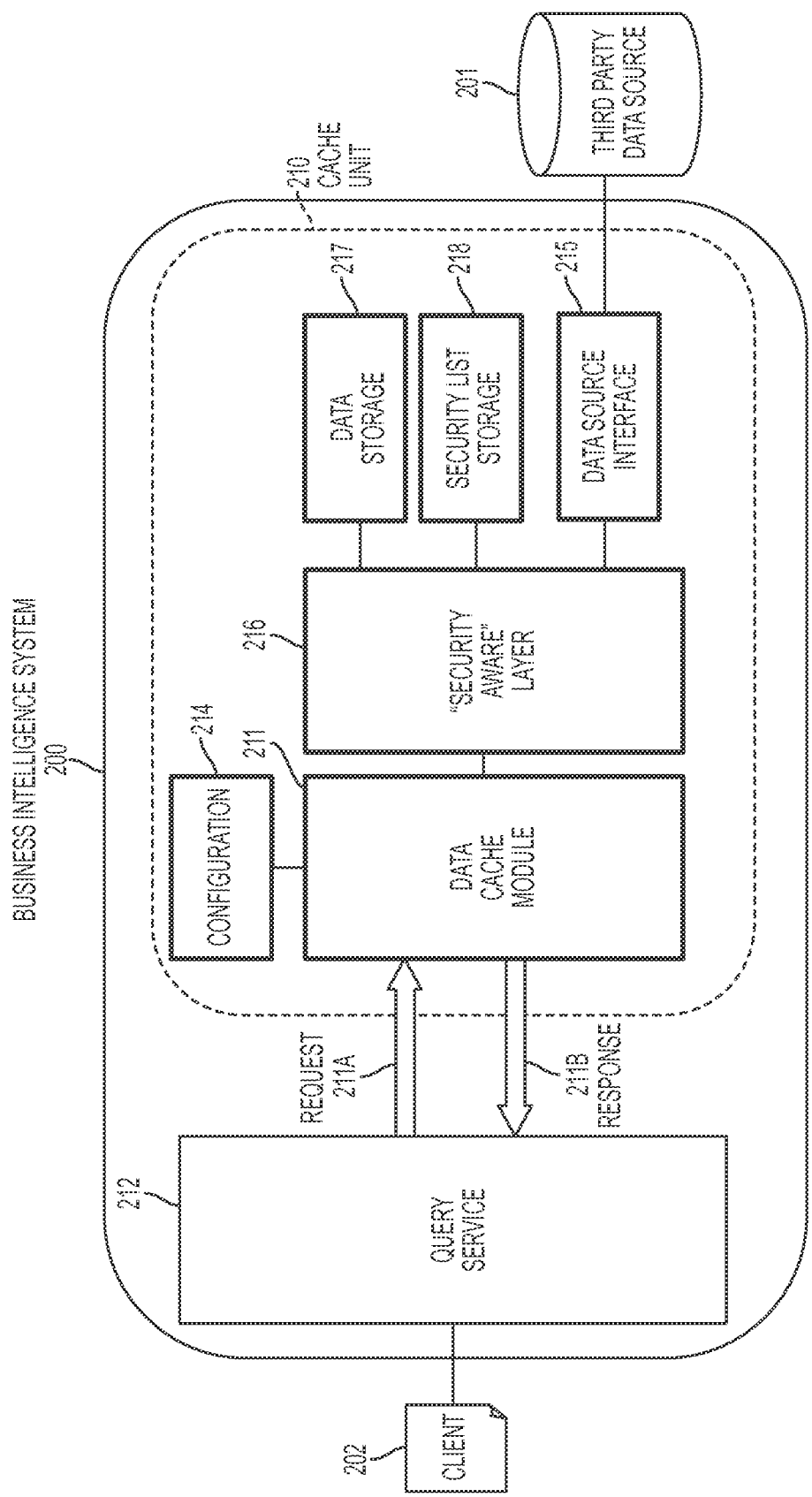
FIG. 2 is a block diagram illustrating a BI system with data caching implemented according to an embodiment of the invention.

FIG. 2 shows a BI system with a cache implemented according to an exemplary embodiment of the invention.

For member retrieval in this exemplary embodiment, when a user query is received from a client 202, a query service 212 makes the necessary member requests 211A to a cache unit 210 in order to satisfy the original query, passing a dimension identifier (e.g. "Geography") and the user's security context with each such request. The data cache module 211 serves as an interface that receives the request 211A and interfaces with a cache configuration module 214 and a "security aware" layer 216.

The "security aware" layer 216 manages security lists stored in security list storage 218. It creates, updates, and deletes security lists stored in the security list storage 218. The lists kept in a security list storage 218 reference cached data kept in the data storage 217. The "security aware" layer 216 manages all security-contextual information including relationships between various members, which may be different for different security contexts. The "security aware" layer 216 maintains the data storage 217 for the cache unit 210.

For member retrieval in this exemplary embodiment, the "security aware" layer 216 checks in the security list storage 218 for the presence of a security list identified by both the user security context and the dimension identifier. If the security list is present, the security list storage 218 returns a link to one or more storage addresses present in the found security list for the members stored in the data storage 217; the member data may then be retrieved by the "security aware" layer 216 directly from data storage 217 and returned in the response 211B to the query service 212. If the security list is not present, the "security aware" layer 216 instructs the data source interface 215 to retrieve the dimension members from the data source 201 associated with the user's security context. If not already present in the data storage 217, the resulting members (and their properties) are stored in data storage 217 and the "security aware" layer 216 uses the corresponding storage addresses to create a new security list in security list storage 218. If certain members are already stored in data storage 217, they are not duplicated but the existing storage addresses are used in the new security list. The requested members are then returned to the query service 212 by the cache unit 210 via a response 211B.

Figure 3:
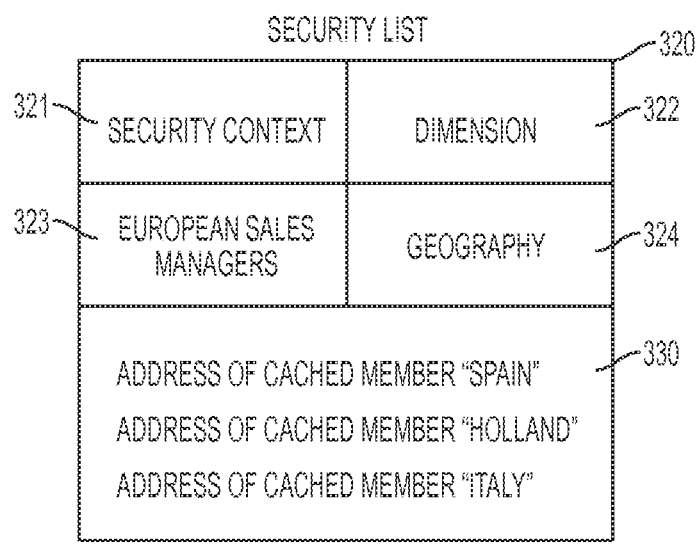
FIG. 3 is a view showing the structure of an exemplary security list according to an embodiment of the invention.

FIG. 3 is a diagram illustrating an exemplary structure of a security list containing references to cached members, according to an embodiment of the invention. In FIG. 3, the security list 320 has a header which includes a security context field 321 and a dimension field 322. This header identifies the security list. The body 330 of security list 320 includes a list of addresses (e.g. indices) to the storage location in cache of the members associated with this security list. For example, the value of the security context field 321 is "European Sales Managers" and the value of the dimension field 322 is "Geography" 324. The body 330 of the security list includes one or more addresses where the corresponding members are stored in cache e.g., the data storage 217 in FIG. 2. For example, the body 330 of the security list includes the address of cached member "Spain", the address of cached member "Holland", and the address of cached member "Italy".

Figure 4A:
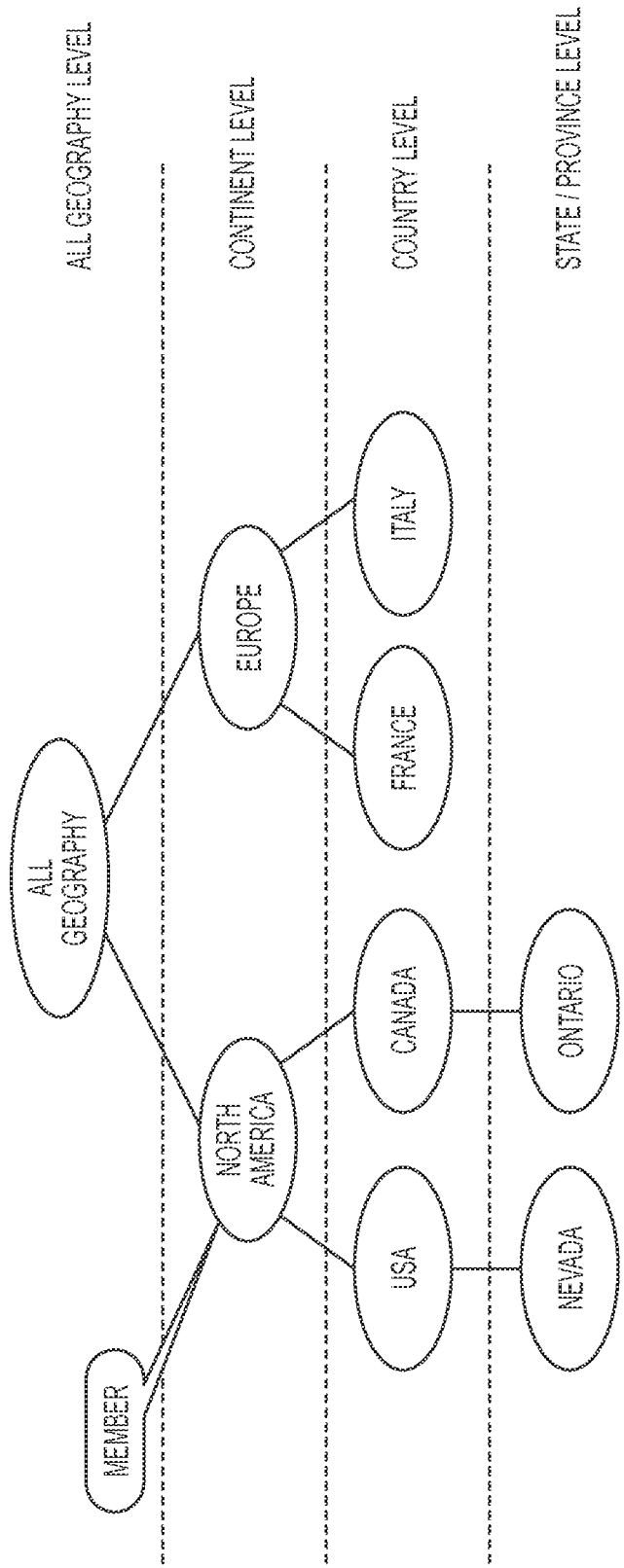
FIGS. 4A-4E are diagrams illustrating security rights and corresponding security lists for a Geography dimension, according to an embodiment of the invention.

FIG. 4A is a diagram illustrating a Geography dimension having a single hierarchy of levels and members according to an exemplary embodiment of the invention. The Geography dimension may be split into four levels: a state/province level having members Nevada and Ontario, a country level having members USA, Canada, France, Italy, a continent level having members North America and Europe, and the main or root level i.e., all Geography level.

Figure 4B:
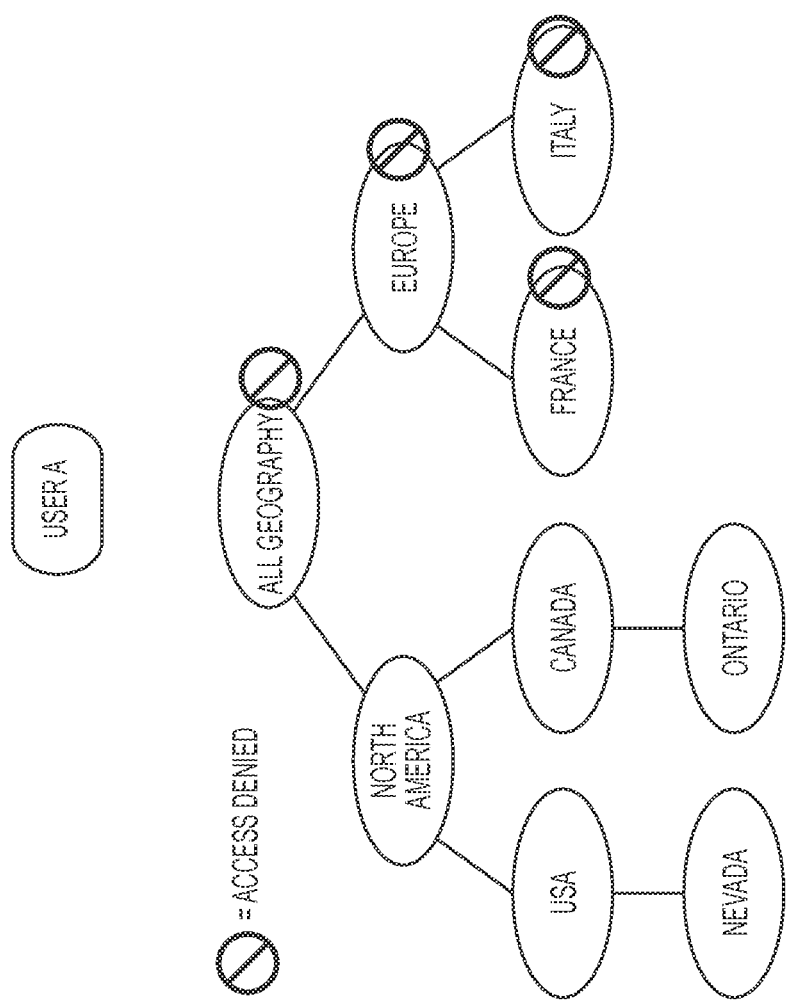

As shown in FIG. 4B, different users may have access to different levels and members within each level of the Geography dimension. For example, user A may only access data for the continent level member North America. Accordingly, user A is accorded access to the North America member and any lower level members such as USA and Canada. That is, the root node member for user A is North America and all children nodes of the North America are accessible to the user A. On the other hand, other Geography dimension members at the country level such as Europe and its children nodes are not accessible to the user A.

Figure 4C:
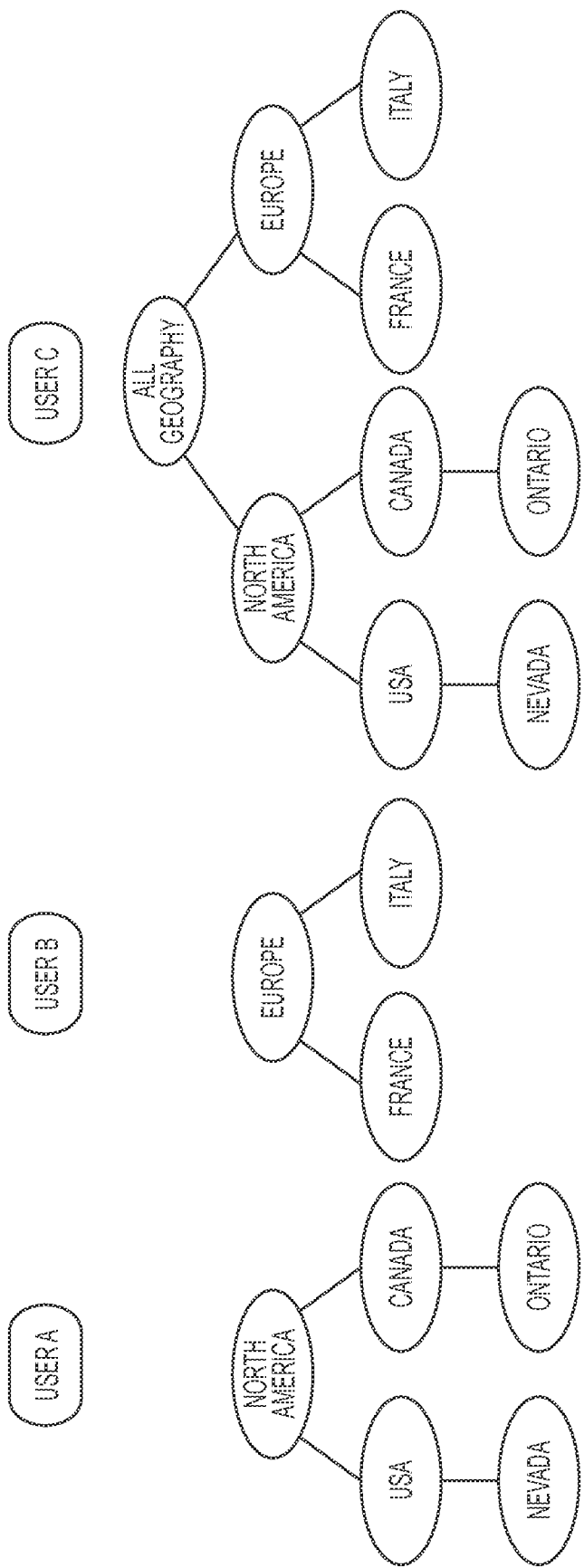

FIG. 4C shows exemplary views of the same dimension for various users according to an exemplary embodiment. For example, the user A can access the North America member and all its children nodes, user B can access the Europe member and all its children nodes and user C can access all members of the Geography dimension.

Figure 4D:
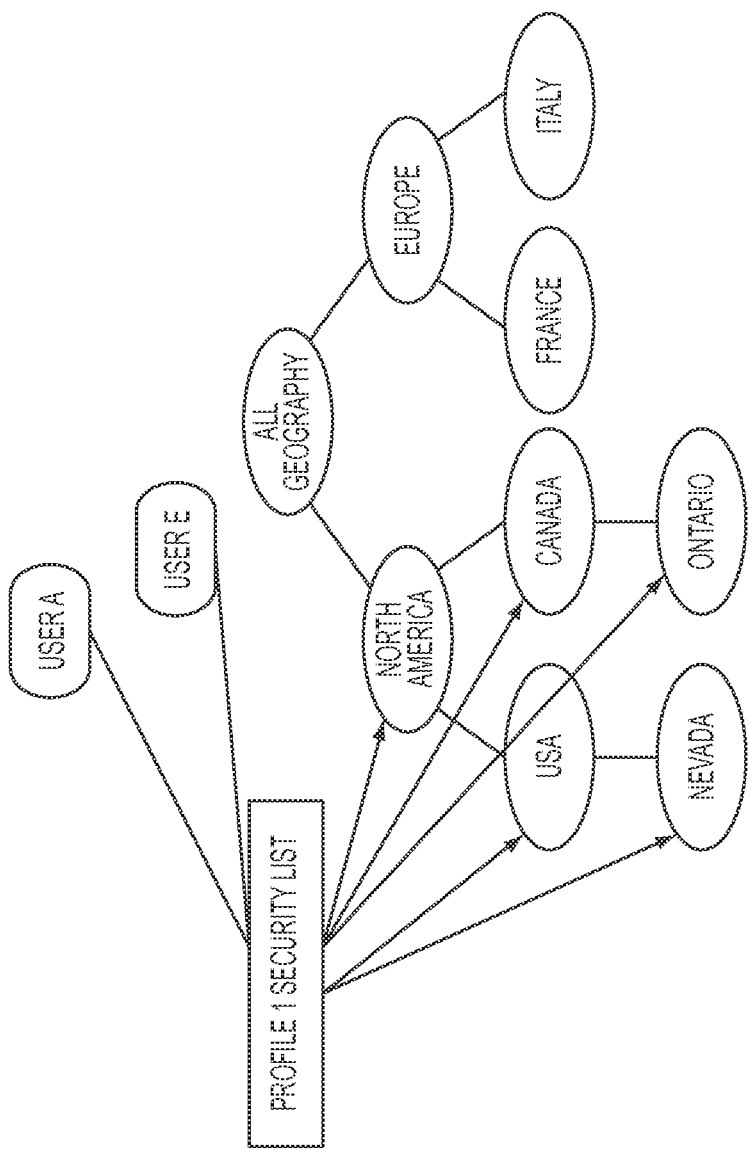
Figure 4E:
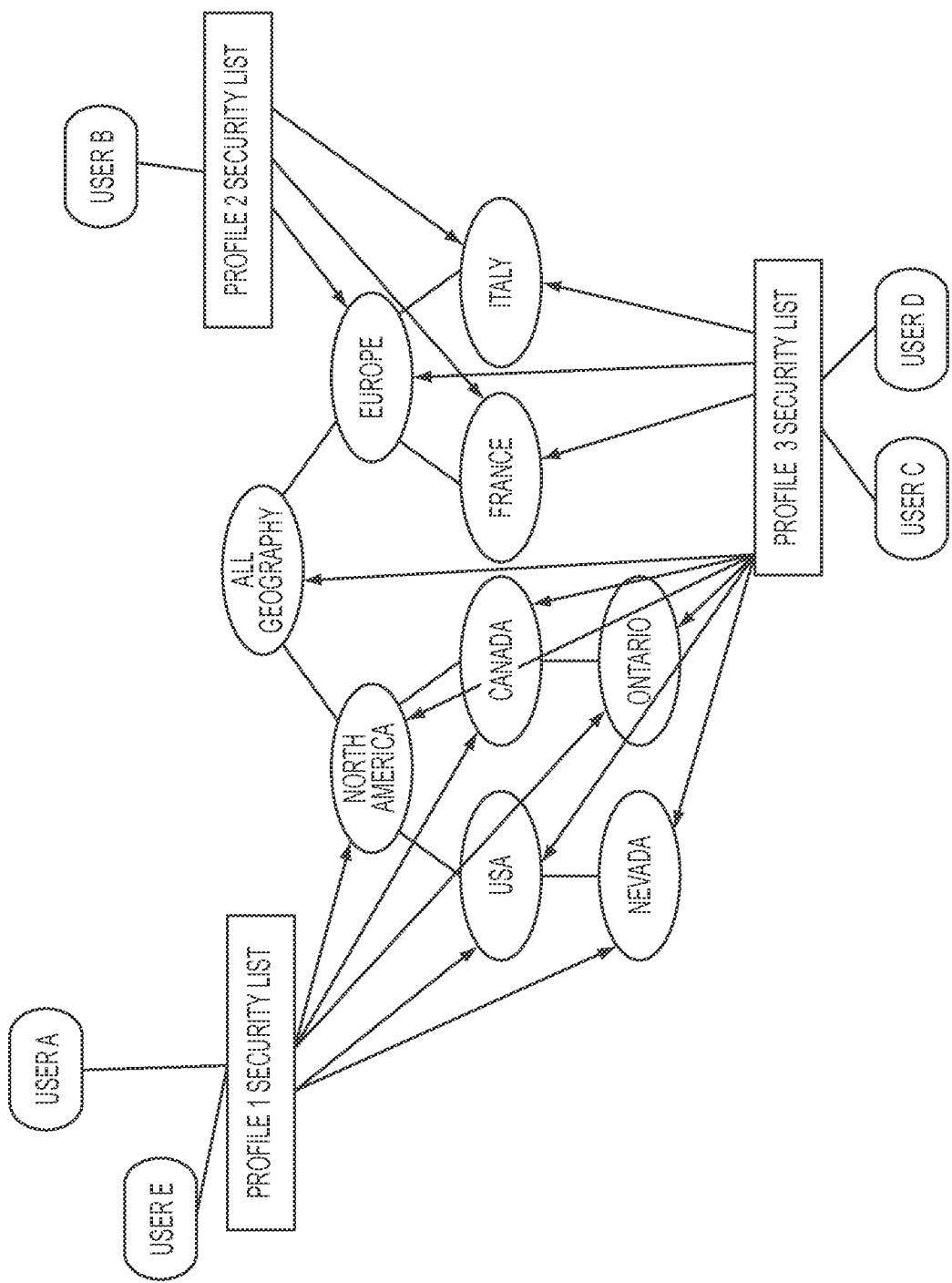

FIG. 4D illustrates the use of a security list associated with a security context for one or more users to provide access to dimensions and members within a cache. Users A and E both have a security context: Profile 1. When either user A or user E requests data, the security list for Profile 1 is discovered. This Profile 1 security list links the users who have that security context, e.g., users A and E, to the North America member and all its children. FIG. 4E shows additional security lists for other security contexts: Profile 2 and Profile 3. Here, user B has a Profile 2 as its security context. This security context is associated with the Profile 2 security list, which links user B to the Europe member and all its children. Users C and D have Profile 3 as their security context. This security context is associated with the Profile 3 security list, which links users C and D to all members in the Geography dimension.

Figure 5:
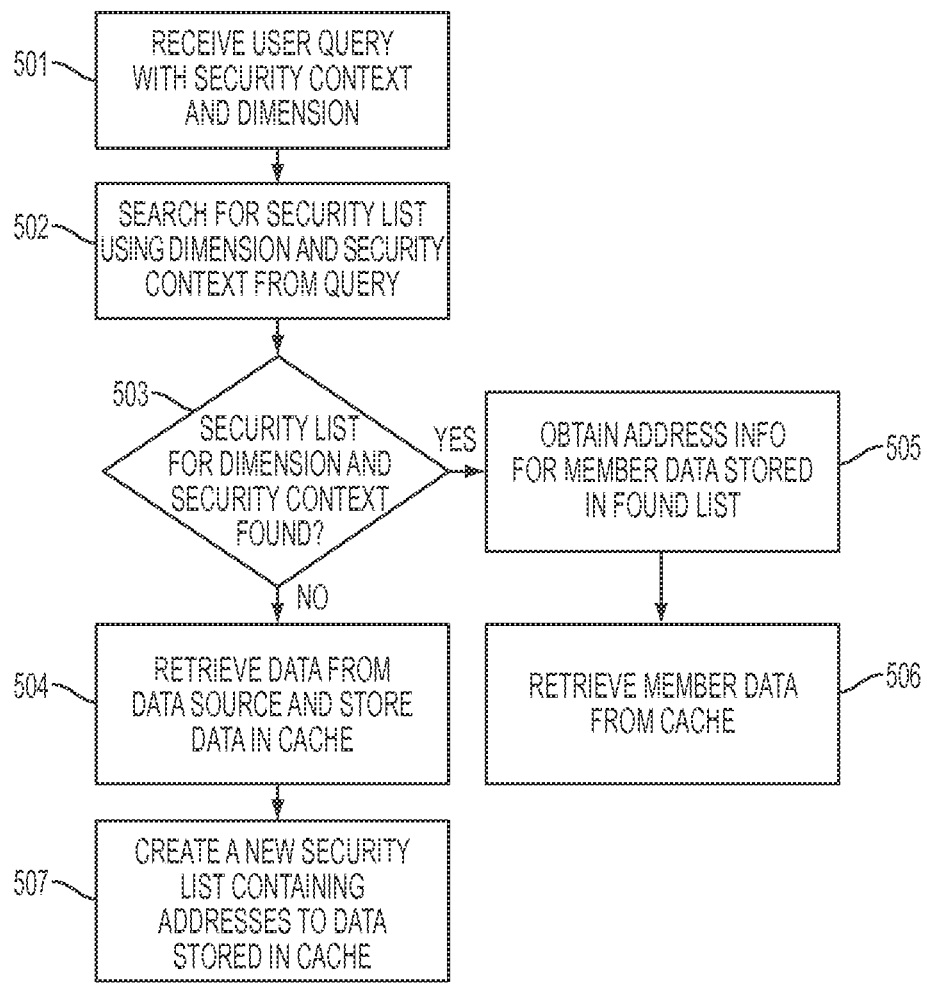
FIG. 5 is a flow chart illustrating a secure member caching process according to an embodiment of the invention.

FIG. 5 is a flow chart illustrating a secure member caching process according to an exemplary embodiment of the invention. In operation 501, a user query is received. Although user queries submitted to the query engine of a BI system potentially reference multiple dimensions, such queries are decomposed into sub-queries by the query service, and so it can be assumed that the user query received by this secure member caching process is a member request for a single dimension. This user query also includes the user's security context.

As described above, the security context of a given user of the BI system, querying/reporting data against a particular OLAP data source, is defined by the "effective" security profiles (based on security groups that this user belongs to and any role selected when logging in) for that authenticated user and that OLAP data source. That said, a user's security context can be modified as the user interacts with the BI system. For example, when preparing to report against a specific OLAP cube, a user may be prompted to further describe his/her role within the organization. Once authenticated, this role would become part of this user's security context for subsequent actions in the BI system, and the secure member caching process would consider this modified security context to be a different security context.

In operation 502, a search in the security lists is performed based on the dimension and security context identified in the user query received in operation 501. If a match is found (operation 503—Yes), address information is obtained for the corresponding member data in cache in operation 505. In operation 506, the requested member data is then retrieved directly from cache by using the obtained address information. On the other hand, if no security list is found for the current security context and dimension (operation 503—No), the requested members are retrieved from the data source and are stored in cache, in operation 504. In operation 507, a new security list is created in cache containing addresses to the members stored in cache.

In an exemplary embodiment, each dimension member is only stored once in the data cache. When a dimension member retrieval request is made to the data cache for a user security context already encountered for that dimension, there is no need to query the underlying data source; the cached members pointed to by the security list for the current dimension and user security context are simply returned.

Every user sharing the same security context (e.g., every sales manager in Canada) will be able to access data stored in cache using the security lists associated with that security context.

Figure 6:
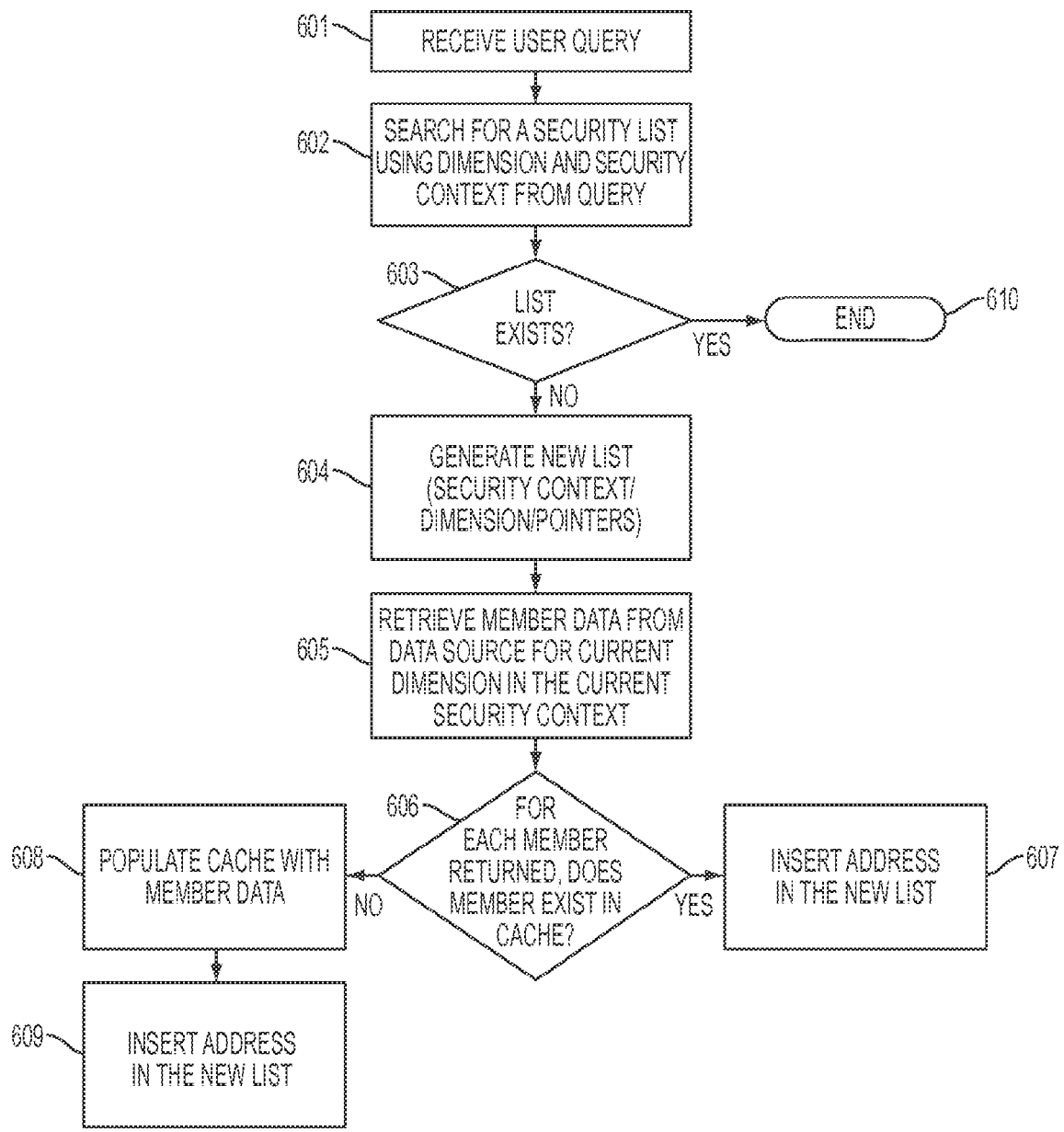
FIG. 6 is a flow chart illustrating generation of a security list according to an embodiment of the invention.

FIG. 6 is a flow chart illustrating generation of a security list in a secure member caching process according to an exemplary embodiment. In operation 601, a user query is received. In operation 602, the process searches for a security list based on the security context and dimension obtained in the received user query. In particular, the obtained dimension and security context are combined into a key or identifier according to predetermined rules. Existing security lists are searched using this generated key.

If a security list identified by the generated key exists (operation 603—yes), the process ends, operation 610. On the other hand, if no such list is found (operation 603—no), a new security list is generated in operation 604. For example, a new security list will be initialized to include a key field and an address field. The key field is assigned a value which corresponds to the generated key.

Next, in operation 605, member data are retrieved from the data source for the current dimension in the current user's security context. Next, in operation 606, it is checked whether each returned member exists in cache. If the member already exists in cache (operation 606—yes), a reference to this member, such as the address of that member in cache, is inserted into the new security list in operation 607.

If the member is not stored in cache (operation 606—no), the cache is populated with the data of this member in operation 608 and a reference to the member, such as the address of that member data in cache, is added to the new security list in operation 609. Next, the process proceeds to implement analogous operations for the next returned member. If no other dimension member is returned, the process returns to operation 610 where it ends.

Figure 7A:
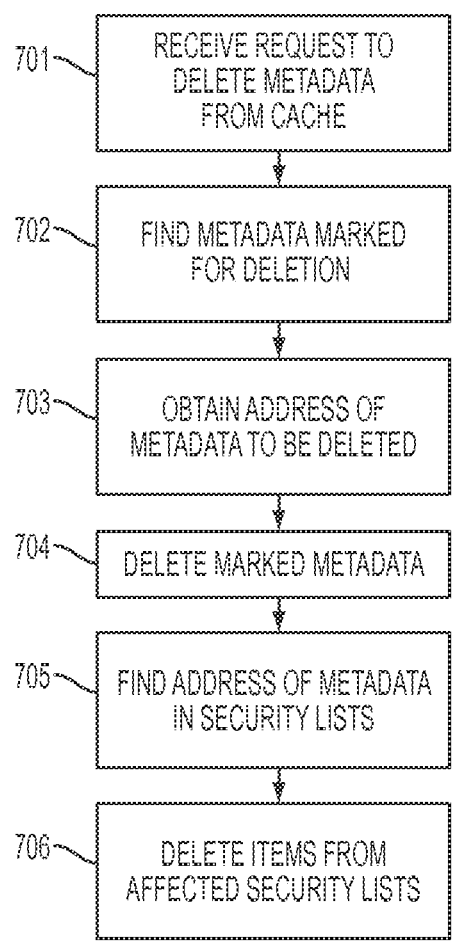
FIGS. 7A and 7B are flow charts illustrating deletion of a security list according to an embodiment of the invention.
Figure 7B:
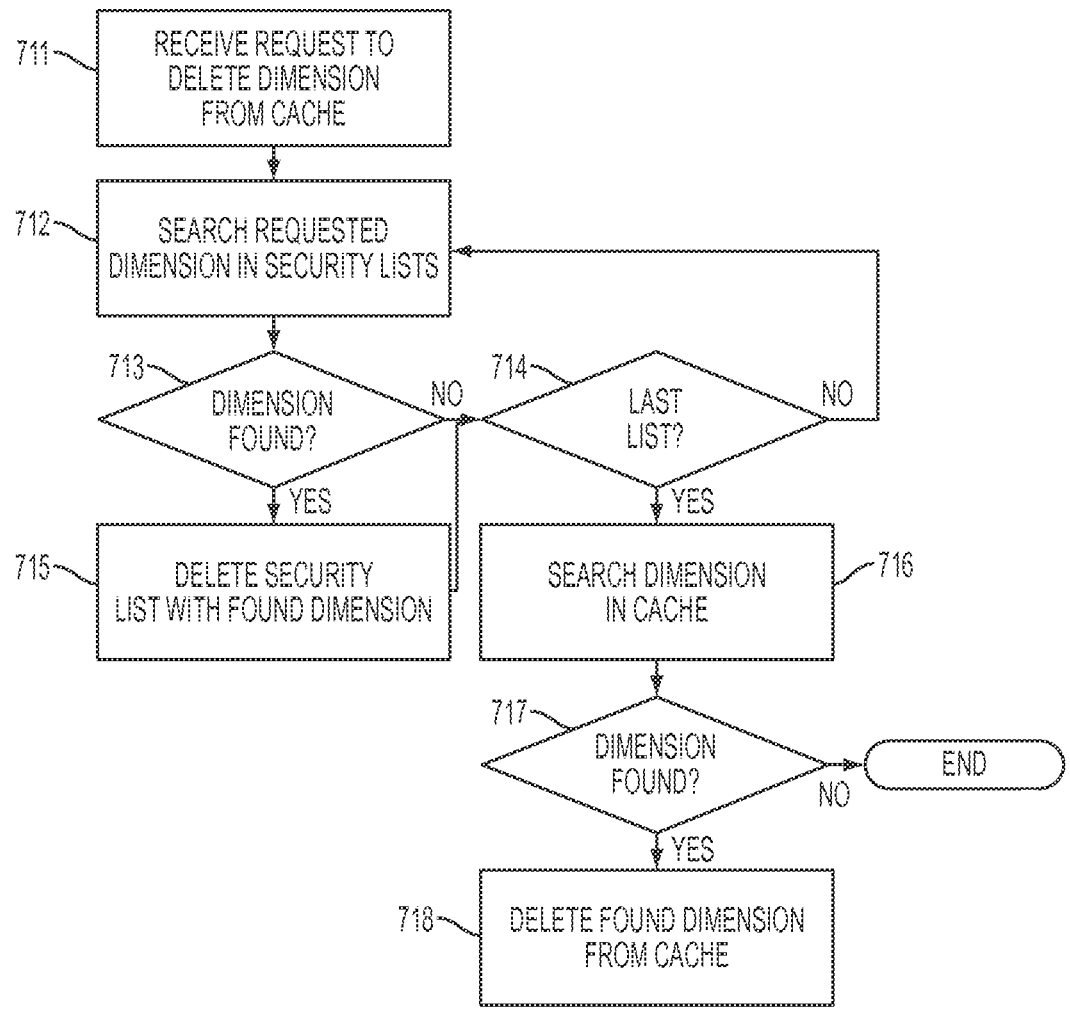

FIGS. 7A and 7B are flowcharts illustrating deletion of security lists according to an exemplary embodiment of the invention.

The BI system revises the conventional eviction strategy for cache to include deletion of security lists. In particular, the eviction strategy for the cache could be conducted on a "dimension by dimension" basis, triggered by a cache size limit or a time limit. In FIG. 7A, a request to delete data, in this example metadata, from cache is received in operation 701, and that metadata is marked for deletion.

For example, a size limit for the cache has been reached and metadata is being purged from cache on a dimension by dimension basis to free memory for subsequent metadata. Alternatively, metadata may be purged on a time basis. For example, if any metadata in the dimension is not used for a predetermined period of time, the metadata for that dimension is purged from cache. A combination of the two methods can be used to determine the metadata to be deleted from cache. Also, the cache may need to purge metadata because of security rule changes or other metadata changes in the underlying data source (e.g. member data updated or deleted, as sometimes occurs with slowly-changing dimensions).

To ensure that cache is sufficiently up to date, in an exemplary embodiment, a user configurable expiry period is provided. If the expiry period is reached, the cache data is purged and reloaded. In an exemplary embodiment, this scheme might work with all source system types and does not require specific knowledge about the underlying security system. If facilities are available to determine dimension updates or security updates such as triggers or polling of updates, then these facilities are used to know when to update the cache.

Metadata marked for deletion is found, in operation 702, according to a predetermined scheme. In operation 703, the address of the metadata marked for deletion is obtained. The address of the metadata is temporarily stored so that corresponding security lists can be determined. In operation 704, the marked metadata is deleted. In operation 705, the stored address of metadata is used to find security lists for this metadata. The security lists store pointers to metadata locations in cache. Accordingly, if any pointer kept in a security list points to the cache location of a deleted metadata item, that pointer needs to be deleted from that security list, which is performed by operation 706.

An alternative eviction strategy, illustrated in FIG. 7B, may be based on a unique identifier for the dimension. For example, the dimension may be Geography. A request to delete this dimension from cache is received in operation 711. In operation 712, the system searches for stored security lists that are partially identified by the Geography dimension. In operation 713, the system determines whether the current security list is keyed on the Geography dimension. If not (operation 713—No), a check is performed to determine whether the last list was checked, in operation 714. If other security lists are present, the system returns to operation 712, to check whether more lists are keyed on the requested dimension.

For example, one security list might be for the "Employees" security context and the Geography dimension, another for the "Sales Managers" security context and the Time dimension, and another list for the "Cashiers" security context and the Geography dimension. Then if the dimension to be deleted from cache is Geography, all security lists identified by this dimension need to be deleted, meaning that security lists "Employees"/Geography and "Cashiers"/Geography are to be deleted.

If the current security list is partially identified by the requested dimension (operation 713—Yes), this security list is deleted in operation 715. The system then checks whether other lists are present that need to be checked for the dimension, operation 714. If other lists are present (operation 714—No), the system returns to operation 712, to check whether more lists are keyed on the requested dimension.

On the other hand, if all the lists were checked (in operation 714—yes), the dimension is then searched in the cache, in operation 716. The system searches for the dimension in the cache based on the same unique key or identifier, which may be the string "Geography" for example. If this dimension is not found in metadata cache, operation 717—no, the process ends. If the dimension is found, operation 717—yes, the system deletes the dimension from cache in operation 718.

In an exemplary embodiment and as an additional optimization for the BI system, commonly used data may be preloaded into cache. Member data may be preloaded to the data cache in advance (when the system is starting up) by submitting member queries for the more commonly used dimensions, on behalf of sample users belonging to the main security profiles accessing the system.

Also, as an additional optimization for the BI system, a modeling tool may be provided within the BI system environment, the purpose of which is to represent OLAP cube metadata such as dimensions, hierarchies, and levels, as well as augment this metadata with new properties that are automatically provided to the BI system query engine. Then, by supporting a new dimension property in this modeling tool called "secured" for example, the modeler can specify which dimensions within which cubes actually require security processing. Consequently, values for this property can be verified by the cache retrieval logic to remove the overhead of creating (and processing) security lists whenever the members being returned to the calling query engine are for a dimension that does not need to be secured (i.e. one that will never have security applied to it, therefore making it suitable to directly return its cached members without concern for limits on visibility).

As another memory optimization technique for the security-aware member caching, an exemplary embodiment can include a separate activity that runs in parallel or on a schedule, to recognize identical security lists and collapse these into a single list. Any two identical lists having been collapsed this way, would have originated from the querying of members belonging to the same dimension, in two different security contexts. Once the two lists become a single list, the keying mechanism identifying this single list would ensure that any of the two security contexts having contributed to the creation of the original lists, are now associated with the resulting single list.

In addition, the cache size can be tailored to hold different amounts of data using different types of storage mechanisms, depending on the available system resources. For example, the caching layer may balance how much of a dimension will be stored in RAM and how much will be stored on disk. Large dimensions may contain over 1,000,000 metadata members. Hence, even if 1,000,000 members actually exist in the cache, these could be kept in RAM or paged to disk.

The exemplary embodiments provided above describe caching with respect to OLAP members. Caching of various different types of data such as metadata may be implemented using the above-described exemplary structures and methods. That is, although exemplary embodiments described are rather beneficial for secure member caching in a system connected to a secured OLAP data source, it can be used in embodiments involving other types of data. For example, it can be used to optimize a cache containing OLAP dimension data, hierarchy data, and level data when access to these types of data needs to be secured according to the rules of the data source. It can also be used to optimize a cache containing OLAP cell data when access to tuple values needs to be secured. Furthermore, it can be used to optimize a cache containing non-OLAP data in a system connected to a secured non-OLAP data source, whenever access to particular cached data needs to be secured according to the rules of the data source.

Figure 8:
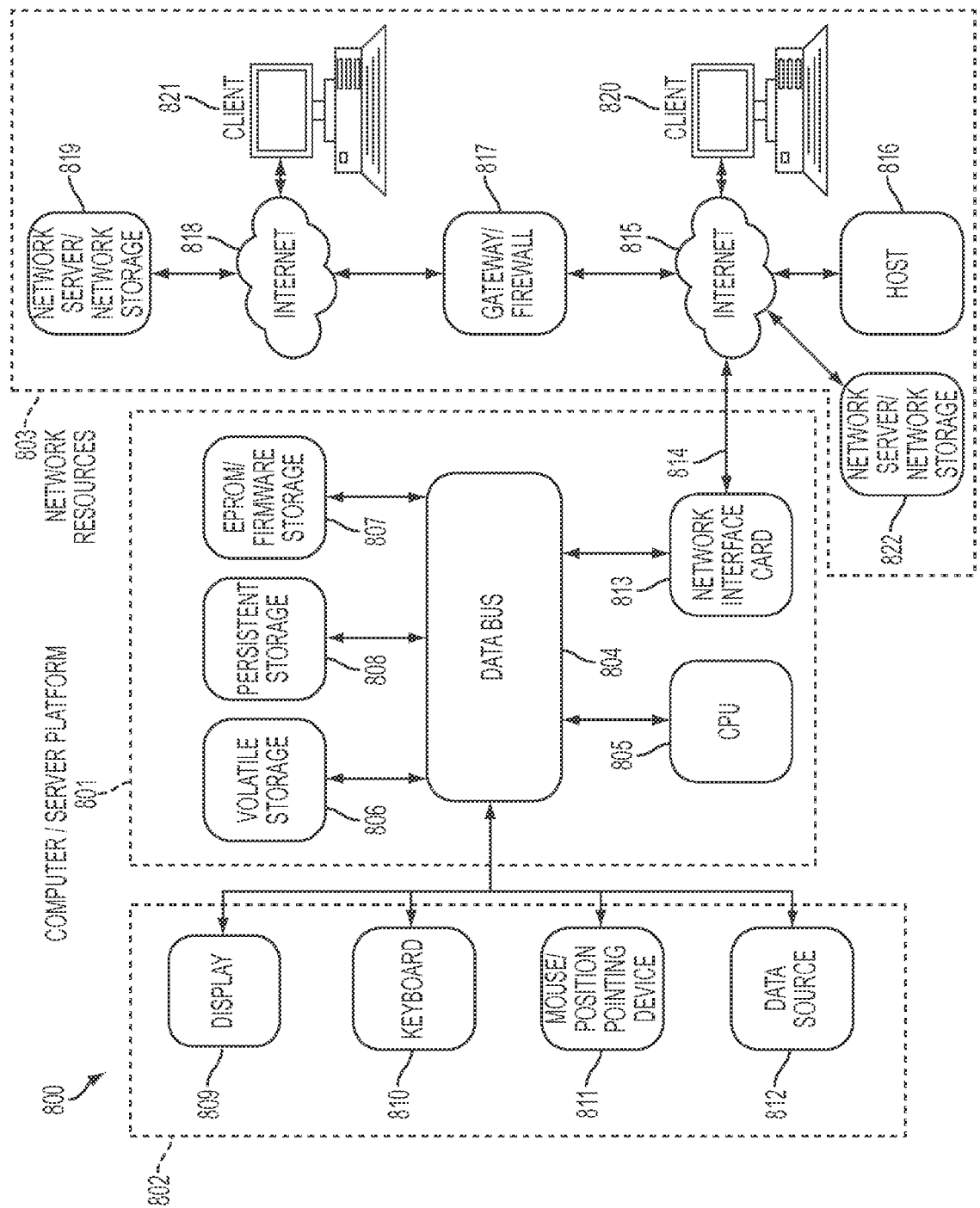
FIG. 8 is a diagram illustrating a computer system environment in which exemplary embodiments of the invention can operate.

FIG. 8 is a block diagram that illustrates a computer/server system 800 according to an exemplary embodiment. The system 800 includes a computer/server platform 801, peripheral devices 802 and network resources 803.

The computer platform 801 may include a data bus 804 or other communication mechanism for communicating information across and among various parts of the computer platform 801, and a processor 805 coupled with bus 801 for processing information and performing other computational and control tasks. Computer platform 801 also includes a volatile storage 806, such as a random access memory (RAM) or other dynamic storage device, coupled to bus 804 for storing various information as well as instructions to be executed by processor 805. The volatile storage 806 also may be used for storing temporary variables or other intermediate information during execution of instructions by processor 805.

Computer platform 801 may further include a read only memory (ROM or EPROM) 807 or other static storage devices coupled to bus 804 for storing static information and instructions for processor 805, such as basic input-output system (BIOS), as well as various system configuration parameters. A persistent storage device 808, such as a magnetic disk, optical disk, or solid-state flash memory device is provided and coupled to bus 801 for storing information and instructions. For example, the persistent storage device 808 may store one or more security lists and may also include cache that stores metadata members.

Computer platform 801 may be coupled via bus 804 to a display 809, such as a cathode ray tube (CRT), plasma display, or a liquid crystal display (LCD), for displaying information to a user of the computer platform 801. An input device 820, including alphanumeric and other keys, is coupled to bus 801 for communicating information and command selections to processor 805. Another type of user input device is cursor control device 811, such as a mouse, a trackball, or cursor direction keys for communicating direction information and command selections such as an OLAP query to a processor 804 and for controlling cursor movement on display 809. This input device typically has two degrees of freedom in two axes, a first axis (e.g., x) and a second axis (e.g., y), that allows the device to specify positions in a plane.

An external storage device (a data source) 812 may be connected to the computer platform 801 via bus 804 that stores metadata used by the computer platform 801. Although only one data source 812 is depicted for purposes of simplicity, a number of data sources 812 may be present as well as other types of data sources.

The term "computer-readable medium" as used herein refers to any medium that participates in providing instructions to processor 805 for execution. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having two or more wires, a portable computer diskette such as a floppy disk or a flexible disk, magnetic tape or any other magnetic medium, a hard disk, a random access memory (RAM), a read-only memory (ROM), an erasable programmable read-only memory (EPROM or Flash memory), a memory card, any other memory chip or cartridge, an optical fiber, a portable compact disc read-only memory (CD-ROM), any other optical medium, punchcards, papertape, any other physical medium with patterns of holes, or any other medium from which a computer can read or suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in a base band or as part of a carrier wave. Such a propagated signal may take any of a variety of forms, including, but not limited to, the electromagnetic, optical, or any suitable combination thereof. The computer readable signal medium may include coaxial cables, copper wire and fiber optics, including the wires that comprise data bus 804. The computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc. or any suitable combination of the foregoing.

Computer program code for carrying out operations for aspects of the exemplary embodiments may be written in any combination of one or more programming languages, including an object oriented programming language such as Java, Smalltalk, C+, .Net or the like and conventional procedural programming languages. The program code may execute entirely on the user's computer, partly on the user's computer, as a stand-alone software package, partly on the user's computer and partly on a remote computer or entirely on the remote computer or server. The remote computer may be connected to the user's computer through any type of network, including a local area network (LAN) or a wide area network (WAN), or the connection may be made to an external computer (for example, through the Internet using an Internet Service Provider).

The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 808. Volatile media includes dynamic memory, such as volatile storage 806.

Various forms of computer readable media may be involved in carrying one or more sequences of one or more instructions to processor 805 for execution. For example, the instructions may initially be carried on a magnetic disk from a remote computer. Alternatively, a remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on the data bus 804. The bus 804 carries the data to the volatile storage 806, from which processor 805 retrieves and executes the instructions. The instructions received by the volatile memory 806 may optionally be stored on persistent storage device 808 either before or after execution by processor 805. The instructions may also be downloaded into the computer platform 801 via Internet using a variety of network data communication protocols well known in the art.

The computer platform 801 also includes a communication interface, such as network interface card 813 coupled to the data bus 804. Communication interface 813 provides a two-way data communication coupling to a network link 814 that is connected to a local network 815. For example, communication interface 813 may be an integrated services digital network (ISDN) card or a modem to provide a data communication connection to a corresponding type of telephone line. As another example, communication interface 813 may be a local area network interface card (LAN NIC) to provide a data communication connection to a compatible LAN. Wireless links, such as well-known 802.11a, 802.11b, 802.11g and Bluetooth may also be used for network implementation. In any such implementation, communication interface 813 sends and receives electrical, electromagnetic or optical signals that carry digital data streams representing various types of information.

Network link 813 typically provides data communication through one or more networks to other network resources. For example, network link 814 may provide a connection through local network 815 to a host computer 816, or a network storage/server 817. Additionally or alternatively, the network link 813 may connect through gateway/firewall 817 to the wide-area or global network 818, such as an Internet. Thus, the computer platform 801 can access network resources located anywhere on the Internet 818, such as a remote network storage/server 819, which is another example of a data source. On the other hand, the computer platform 801 may also be accessed by clients located anywhere on the local area network 815 and/or the Internet 818. The network clients 820 and 821 may access the system 801 remotely.

Local network 815 and the Internet 818 both use electrical, electromagnetic or optical signals that carry digital data streams. The signals through the various networks and the signals on network link 814 and through communication interface 813, which carry the digital data to and from computer platform 801, are exemplary forms of carrier waves transporting the information.

Computer platform 801 can send messages and receive data, including program code, through the variety of network(s) including Internet 818 and LAN 815, network link 814 and communication interface 813. In the Internet example, when the system 801 acts as a network server, it might transmit a requested code or data for an application program running on client(s) 820 and/or 821 through Internet 818, gateway/firewall 817, local area network 815 and communication interface 813. Similarly, it may receive code from other network resources.

The received code may be executed by processor 805 as it is received, and/or stored in persistent or volatile storage devices 808 and 806, respectively, or other non-volatile storage for later execution. In this manner, computer system 801 may obtain application code in the form of a carrier wave.

The flowchart and block diagrams in the Figures illustrate the architecture, functionality, and operation of possible implementations of systems, methods and computer program products according to various exemplary embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or two blocks may sometimes be executed in the reverse order, depending upon the functionality involved. It will also be noted that each block of the block diagram and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology as used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or acts for performing the function in combination with other claimed elements as specifically claimed. The description of the exemplary embodiments has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of

What we claim is:

1. A secure caching method comprising:
   receiving a user request for data and a security context which indicates a role of a user and a corresponding at least one dimension of data organized in hierarchical levels, wherein the security context defines access rights to a data source;
   searching a cache for the requested data based on the user request and the received security context, wherein the searching comprises determining whether the received security context is present with the received corresponding at least one dimension in a list of at least one lists which identifies data stored in the cache;
   if the requested data is found in the cache, returning the cached data in response to the user request, and
   if the requested data is not found in the cache, obtaining the requested data from the data source, storing the obtained data in the cache and associating the obtained data with the security context, and returning the requested data in response to the user request.

2. The method according to claim 1, wherein the list which identifies data stored in the cache associates the cached data with the security context and wherein if the requested data is not found in the cache, generating a new list for associating the obtained data stored in the cache with the security context by storing references to the obtained data stored in the cache.

3. The method according to claim 2, wherein the new list is stored in a list storage unit in which a number of stored lists increases incrementally based on unique received user queries.

4. The method according to claim 2, further comprising purging one of the lists from a list storage unit if a change in the cached data compromises integrity of the one of the lists.

5. The method according to claim 2, further comprising initializing a list storage unit prior to using the cache, wherein the initializing comprises submitting queries to the data source for commonly used data for commonly used security contexts, loading the cache with the results of the queries and creating security lists which reference the cached data.

6. The method according to claim 2, further comprising checking stored lists for redundancy and if two identical lists are found, the two identical lists are collapsed into a single list.

7. The method according to claim 1, wherein the data is metadata.

8. The method according to claim 1, wherein the security context is a user security profile.

9. The method according to claim 1, further comprising:
   generating a corresponding list that associates the cached data with the security context;
   searching the corresponding list for the data specified in the user request; and
   checking the security context indicated in the corresponding list for the data when the data is found in the corresponding list,
   wherein the cached data is returned when the security context stored in the corresponding list for the data matches the security context providing in the request.

10. The method according to claim 9,
    wherein, if the requested data does not exist in cache, generating a new list comprising the profile of the at least one authorized user and a dimension comprising at least one member data and retrieving the requested data from a remote data source and storing the retrieved data in the cache, and
    wherein, if a corresponding member data exists in the cache, inserting a new identifier which identifies an address of the corresponding member data into the new list.

11. The method according to claim 1, wherein the cached data is stored with a corresponding list comprising a header, the header comprising a security context field and a dimension field and a body comprising a list of addresses to a storage location in the cache of data members associated with the corresponding list.

12. The method according to claim 1, wherein the security context comprises a plurality of hierarchical levels for different roles.

13. A secure caching method in a system connected to a user and a data source, the method comprising:
    receiving a user request and a security context which indicates a role of the user and a corresponding at least one dimension of data organized in hierarchical levels and a data identifier, wherein the security context defines access rights to the data source;
    checking in a list storage for the presence of a list identified by the security context and the data identifier; and
    if the list is not present, creating a list in the list storage identified by the security context and the data identifier, retrieving data from the data source, and storing the retrieved data in a data storage, and populating the created list with addresses of storage of the retrieved data stored in the data storage; and
    if the list is present, determining whether the received security context is present with the received corresponding at least one dimension in the list and retrieving data from the data storage using the storage addresses in said list.

14. The method according to claim 13, wherein the data identifier is a cube dimension identifier.

15. The method according to claim 13, wherein the data storage is a cache that comprises data provided from a plurality of heterogeneous remote data sources.

16. The method according to claim 13, further comprising preloading the data storage and the list storage, wherein the list storage is preloaded with lists corresponding to commonly used security contexts and data identifiers, and the data storage is preloaded with commonly used data referenced by said preloaded lists.

17. The method according to claim 13, wherein the data stored in data storage is Online Analytic Processing (OLAP) metadata.

18. A caching system comprising:
    a processor executing software modules; and
    a memory storing the software modules, wherein the software modules comprise:
    a receiver module which receives a user request for data and a security context which indicates a role of a user and a corresponding at least one dimension of data organized in hierarchical levels, wherein the security context defines access rights to a data source;
    a search module which searches a cache for the requested data based on the user request and the received security context, wherein the search module determines whether the received security context is present with the received corresponding at least one dimension in a list of at least one lists which identifies data stored in the cache;

a management module which obtains the cached data in response to the user request if the requested data is found in the cache, wherein if the requested data is not found in the cache, the management module obtains the requested data from the data source, stores the obtained data in the cache and associates the obtained data with the security context, and returns the requested data in response to the user request.

19. The system according to claim 18, wherein if the search module does not find the requested data in the cache, the management module generates a new list for associating the obtained data stored in the cache with the security context by storing references to the obtained data stored in the cache.

20. The system according to claim 19, wherein the management module stores the new list in a list storage unit in which a number of stored lists increases incrementally based on unique received user queries.

21. The system according to claim 19, further comprising a purge module which purges one of the lists from a list storage unit if a change in the cached data compromises integrity of the one of the lists.

22. The system according to claim 19, further comprising a preloading module which initializes a list storage unit prior to using the cache, wherein the preloading module submits queries to the data source for commonly used data for commonly used security contexts, preloads the cache with the results of the queries and creates new security lists which reference the cached data.

23. The system according to claim 19, further comprising a check module which checks stored lists for redundancy and if two identical lists are found collapses the two identical lists into a single list.

24. A non-transitory computer-readable medium storing instructions for secure caching, the instructions comprising:
   receiving a user request for data and a security context which indicates a role of a user and a corresponding at least one dimension of data organized in hierarchical levels, wherein the security context defines access rights to a data source;
   searching a cache for the requested data based on the user request and the received security context, wherein the searching comprises determining whether the received security context is present with the received corresponding at least one dimension in a list of at least one lists which identifies data stored in the cache;
   if the requested data is found in the cache, returning the cached data in response to the user request, and
   if the requested data is not found in the cache, obtaining the requested data from the data source, storing the obtained data in the cache and associating the obtained data with the security context, and returning the requested data in response to the user request.

25. The non-transitory computer-readable medium according to claim 24, wherein the instructions further comprise: if the requested data is not found in the cache, generating a new list for associating the obtained data stored in the cache with the security context by storing references to the obtained data stored in the cache.

26. The non-transitory computer-readable medium according to claim 25, wherein the instructions further comprise the new list is stored in a list storage unit in which a number of stored lists increases incrementally based on unique received user queries.

27. The non-transitory computer-readable medium according to claim 25, wherein the instructions further comprises purging one of the lists from a list storage unit if a change in the cached data compromises integrity of the one of the lists.

28. The non-transitory computer-readable medium according to claim 25, wherein the instructions further comprises initializing a list storage unit prior to using the cache, wherein the initializing comprises submitting queries to the data source for commonly used data for commonly used security contexts, loading the cache with the results of the queries and creating new security lists which reference the cached data.

29. The non-transitory computer-readable medium according to claim 25, wherein the instructions further comprises checking stored lists for redundancy and if two identical lists are found, the two identical lists are collapsed into a single list.

* * * * *